United States Patent [19]

Schwarz et al.

[11] Patent Number: 4,900,155
[45] Date of Patent: Feb. 13, 1990

[54] METHOD OF METERING AN ADDITIVE INTO AND MIXING IT WITH A THERMOPLASTIFIED SYNTHETIC RESIN

[75] Inventors: Wilfried Schwarz, Königswinter; Peter Stommel, Hennef, both of Fed. Rep. of Germany

[73] Assignee: Reifenhauser GmbH & Co. Maschinenfabrik, Troisdorf, Fed. Rep. of Germany

[21] Appl. No.: 333,981

[22] Filed: Apr. 5, 1989

[30] Foreign Application Priority Data

Apr. 8, 1988 [DE] Fed. Rep. of Germany ....... 3811785

[51] Int. Cl.⁴ .......................... B29B 1/06; B01F 15/02
[52] U.S. Cl. ....................................... 366/76; 366/90; 366/99; 366/322
[58] Field of Search ....................... 366/69, 76, 77, 78, 366/79, 90, 91, 96, 97, 98, 99, 324, 322, 318; 425/145, 200

[56] References Cited

U.S. PATENT DOCUMENTS

| | | | |
|---|---|---|---|
| 3,790,136 | 2/1974 | Koch | 366/86 |
| 4,253,771 | 3/1981 | Renk | 366/89 |
| 4,419,014 | 12/1983 | Gale | 366/99 |
| 4,479,884 | 10/1984 | Clarke | 366/99 |
| 4,501,498 | 2/1985 | McKelvey | 366/69 |
| 4,721,589 | 1/1988 | Harris | 425/145 |

FOREIGN PATENT DOCUMENTS 60-01911 9/1985 Japan .

Primary Examiner—Robert W. Jenkins
Attorney, Agent, or Firm—Herbert Dubno

[57] ABSTRACT

A method of mixing a pumpable additive with a thermoplastified flow utilizes a pocketed rotor and stator structure integrated in a worm or screw plastifier and to which the additive is fed by a metering pump at the upstream end of the gap between the rotor and stator surfaces.

10 Claims, 3 Drawing Sheets

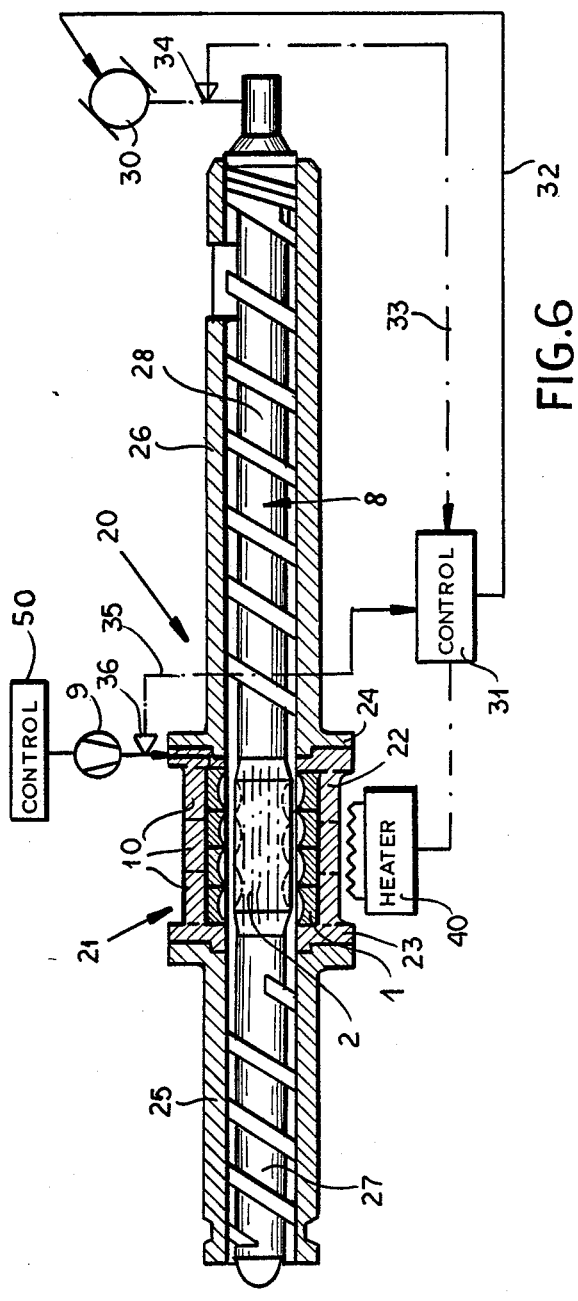
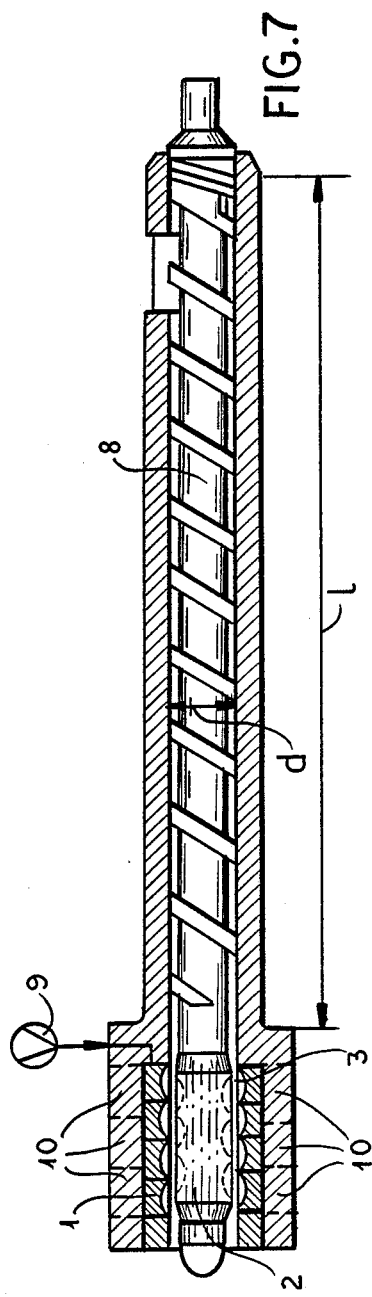

METHOD OF METERING AN ADDITIVE INTO AND MIXING IT WITH A THERMOPLASTIFIED SYNTHETIC RESIN

CROSS REFERENCE TO RELATED APPLICATIONS

This application is related to the commonly owned copending application Ser. No. 07/159,096 filed Feb. 23, 1988 and to the concurrently filed copending application Ser. No. 333,990 (attorney's docket number 17183) based upon German applications P 38 11 787.8 of Apr. 8, 1988 and 38 19 605.0 of June 9, 1988.

FIELD OF THE INVENTION

Our present invention relates to a method of metering at least one additive into a thermoplastic synthetic resin and blending or mixing that additive with the thermoplastic synthetic resin. More particularly, the invention relates to a method of mixing which utilizes the interaction of the additive and a flow of thermoplastified synthetic resin through a gap between a rotor and a stator.

BACKGROUND OF THE INVENTION

In International Patent Document WO 85/01,911, an apparatus for mixing a thermoplastified synthetic resin having a rotor and a stator is described.

In that device, the rotor and the stator have juxtaposed surfaces which define a gap between them.

The rotor and stator surfaces are each formed with circumferential rows of mixing chambers or pockets which are also oriented in axial rows and are identical to one another and have an elongated outline.

At front and rear ends, these mixing chambers terminate in semicircles with a given radius. The numbers of mixing chambers in the circumferential rows and in the axial rows of the rotor and of the stator coincide and the circumferential rows of the rotor are axially offset from the circumferential rows of the stator by about half the length of the mixing chambers.

While the mixing device as described has been found to be satisfactory for many purposes, it has been found that improvement can be obtained and further that the fabrication cost could be reduced.

Furthermore, the overall mixing efficiency and the homogeneity of the mixed product utilizing prior art devices including the mixing chamber of this patent document have created a desire for improvement.

OBJECTS OF THE INVENTION

It is the principal object of the present invention, therefore, to provide an improved method of admixing at least one additive and a flow of a thermoplastified material whereby drawbacks of earlier systems are avoided.

Another object of the invention is to provide a method of mixing an additive with a thermoplastified synthetic resin in which the mixing efficiency is improved and, in an especially simple manner, an additive can be blended homogeneously into a thermoplastic synthetic resin.

Still another object of the invention is to provide an apparatus for carrying out such a method.

SUMMARY OF THE INVENTION

These objects and others which will become apparent hereinafter are attained, in accordance with the invention in a method of blending a pumpable additive with a flow of thermoplastified synthetic resin which comprises the steps of:

(a) generating a flow of a thermoplastified synthetic resin by rotatably driving a plastifying screw in a cylinder of a synthetic-resin-displacing worm press and feeding the synthetic resin to the worm press whereby the synthetic resin is thermoplastified therein and displaced in a flow along the worm press;

(b) along the path of the flow rotating a rotor with and connected to the screw and having an outer peripheral surface juxtaposed with an inner peripheral surface of a stator surrounding the rotor and connected with the cylinder so that the surfaces define an axially extending annular gap between them, each of the surfaces being formed with a plurality of angularly equispaced axially extending rows of axially elongated mixing chambers of identical outline each with semicircular ends of a given radius, the mixing chambers of the inner surface being axially offset from the mixing chambers of the outer surface by substantially half the length of the mixing chambers, the mixing chambers being troughs of circular arc segmental cross section with radii of curvature equal to the given radius and depths less than the given radius, the length of each mixing chamber being three to four times the given radius, the mixing chambers of successive rows of each surface being separated by webs having a thickness less than half of the given radius and the gap having a gap width generating a shear velocity gradient sufficient to effect intimate mixing in the gap;

(c) passing the flow through the gap; and (d) pumping into the gap at least one location around the rotor and at an upstream end of the gap, at least one pumpable additive miscible with the thermoplastified synthetic resin, thereby blending the additive with the thermoplastified synthetic resin.

In its apparatus aspects, therefore, the apparatus for blending a pumpable additive with a flow of thermoplastified synthetic resin can comprise:

a worm press having a cylinder and a plastifying screw rotatable in the cylinder and generating a flow of a thermoplastified synthetic resin fed to the worm press whereby the synthetic resin is thermoplastified therein and displaced in a flow along the worm press;

a rotor along the path of the flow rotating with and connected to the screw and having an outer peripheral surface;

a stator surrounding the rotor and connected with the cylinder, the stator having an inner peripheral surface juxtaposed with the outer peripheral surface of the rotor so that the surfaces define an axially extending annular gap between them, each of the surfaces being formed with a plurality of angularly equispaced axially extending rows of axially elongated mixing chambers of identical outline each with semicircular ends of a given radius, the mixing chambers of the inner surface being axially offset from the mixing chambers of the outer surface by substantially half the length of the mixing chambers, the mixing chambers being troughs of circular arc segmental cross section with radii of curvature equal to the given radius and depths less than the given radius, the length of each mixing chamber being three to four times the given radius, the mixing chambers of successive rows of each surface being separated by webs having a thickness less than half of the given radius and the gap having a gap width generating a shear velocity gradient sufficient to effect intimate mixing in the gap of the flow as the flow passes through the gap; and a pump communicating with a source of a pumpable additive to be admixed with the flow connected to the stator at least one location around the rotor and at an upstream end of the gap, for feeding the pumpable additive into the gap for admixture to the thermoplastified synthetic resin, thereby blending the additive with the thermoplastified synthetic resin.

In both method and apparatus aspects, therefore, the invention is distinguished over the art in that:

A. The mixing chambers are formed as troughs which, in radial section, are circular arc segmented with radii equal to the given radius and a trough depth which is less than the given radius;

B. The mixing chambers each have a length which is between 3 and 4 times the given radius;

C. The webs between the mixing chambers of adjacent axial rows or separating the mixing chambers in each circumferential row have a web thickness which is less than half of the given radius;

D. The shear gap width between the rotor and stator surfaces is such that a sufficiently large shear velocity gradient is generated to effect the mixing as the thermoplastic is forced through the gap by virtue of the fact that the rotor is connected to the worm and the mixing device is connected as part of the worm press, either at an end thereof or at an intermediate location along the length thereof.

Thus an important feature of the invention is that the mixing unit is built right onto and into the worm press with the rotor of the mixing unit connected to the worm shaft or screw of the worm press and the stator connected with the cylinder of the worm press directly or indirectly.

The pump additive is supplied by a pump to the upstream location of the stator to be admitted to the gap at the upstream end thereof. Of course the additive may be supplied at one upstream location or at a plurality of angularly spaced upstream locations or a plurality of additives can be individually supplied at respective upstream locations.

Thus an important aspect of the invention is that the mixing unit is integrated into the worm press and is constructed in accordance with points A through D, above, while the additive is forced by a respective pump through an inlet into the gap at the upstream end thereof to that extent, of course, the method of the invention can be considered to be a method of operating the apparatus or the apparatus to be the essential means for carrying out the method in practice.

While we are not able to fully explain the surprisingly effective results which are obtained, we have discovered that in the method and apparatus as described there are unusual hydrodynamic effects which give rise to an especially intensive mixing and, consequently, an especially homogeneous incorporation or blending of the additive with the thermoplastic flow.

In the past, additives such as coloring agents or special plastics to be blended with a thermoplastified flow as alloying elements generally were fed to the extruder in the worm region thereof and the result was not merely as effective as can be obtained by the incorporation of the special mixing unit of the invention in the worm press as described.

Depending upon need, mixture of additives can be introduced at the or each location or individual additives fed to the gap through respective upstream locations.

The worm or screw of the extruder can drive the rotor directly or indirectly. In an indirect drive an adapter can be connected between the rotor and the screw.

It has been found to be advantageous to uniformly distribute the additive all around the axis of the rotor upon feeding it to the gap, e.g. through a plurality of angularly equispaced bores formed in the stator.

Advantageously, the mixing device has a length of $2d$ to $5d$ where d is the diameter of the worm shaft and preferably about $4d$.

The temperature and pressure conditions for admixing the additive with the thermoplastified flow, of course, can be adjusted to suit the conditions for optimum mixing and can be achieved utilizing modern control or regulation (feedback) techniques with, for example, a computer or microprocessor system for controlling the extruder and the pump or both in any suitable relationship.

According to a feature of the invention the stator is heated at least in part under the control of measurements of the quantity and temperature of the pumpable additive to be admixed with the flow.

In a preferred embodiment of the invention, the additive is fed to the gap with a static pressure which is 5 to 10% higher than the static pressure of the thermoplastic synthetic resin at the upstream end of the mixing device. Under these conditions, the metering of the additive into the mixing device from the pump is not disturbed The pump can be a gear pump, a screw pump or a piston pump and preferably is a positive displacement pump.

The term "additive" as here used can be any pumpable material which can be advantageously admixed with a thermoplastified synthetic resin, including the usual liquid colorants and especially, so-called alloying components, like polyisobutlyene and polymer melts.

BRIEF DESCRIPTION OF THE DRAWING

FIG. 6 is an axial section through a mixing apparatus of the invention in which the mixing device is integrated with the extruder sections at an intermediate point along the length of an extruder line; and FIG. 7 is a view similar to FIG. 6 but wherein the mixing unit forms the end of the extruder line.

SPECIFIC DESCRIPTION

Figure 1:
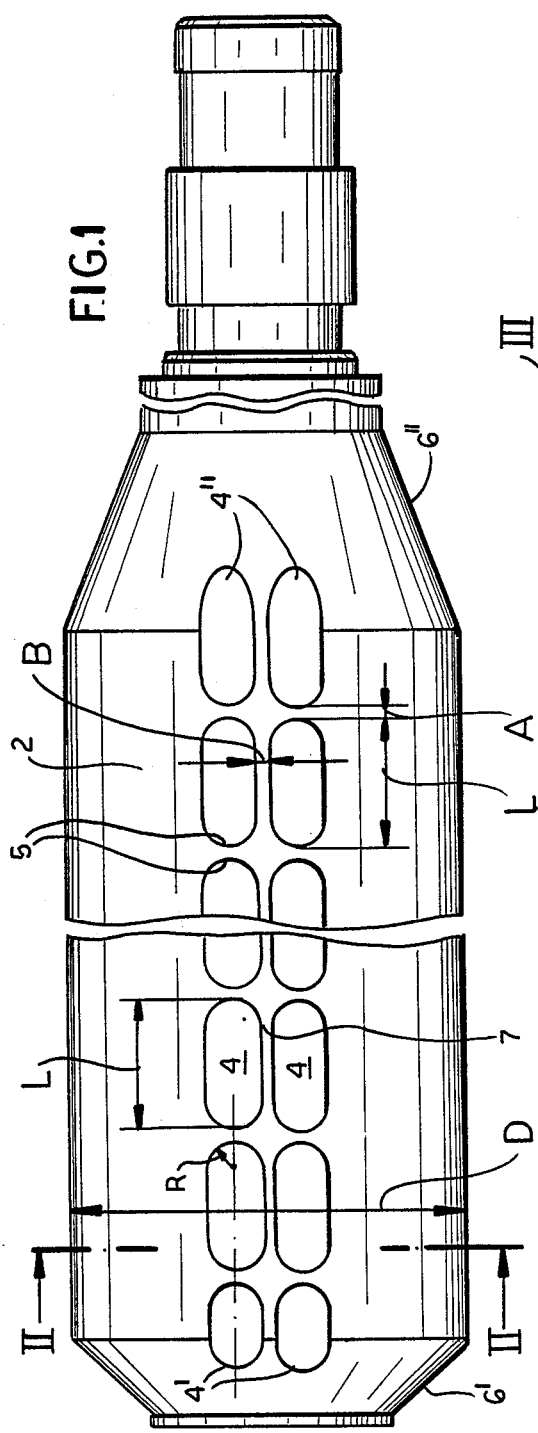
FIG. 1 is a side elevational view of the rotor of a mixing unit according to the invention for carrying out the process thereof.
Figure 2:
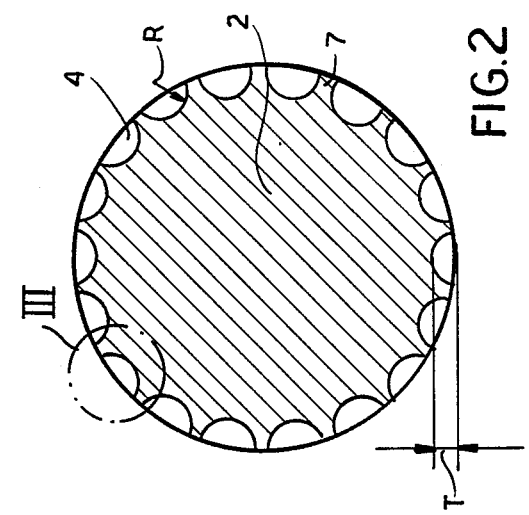
FIG. 2 is a cross sectional view taken along the line II—II of FIG. 1.

Referring first to FIG. 6 it will be apparent that a mixing apparatus 20, according to the invention, comprises a mixing unit 21 in which a housing 22 is flanged at 23, 24, to respective cylinders 25, 26 each receiving a worm section 27 and 28 of a screw 8 in which the rotor 2 is integrated. The housing 22 receives an axial stack of stator rings 1 forming the stator of the mixing unit.

The screw 8 is driven by a rotor 30. A computer or microprocessor-based controller 31 can control the speed of the rotor 30 by a feedback loop 32 and can receive an input via line 33 from a tachometer 34 measuring the speed of the worms and hence and the rate of displacement of the thermoplastified flow.

The control line 35 provides an input from centers 36 to the controller 31, these sensors monitoring the output of the additive pump 9 and the temperature of the additive. A heater controller 40 is operated by the computer 31 as well.

A similar control system can be provided in FIG. 7 where the mixing unit is located at the downstream end of the worm.

FIGS. 1-5 show details of the mixing unit which is integrated in the worm press.

The mixing unit comprises the stator 1 and the rotor 2 whose inner and outer surfaces are juxtaposed to form the gap 3 through which the flow of synthetic resin is forced by the worm and in which the mixing occurs.

The diameters of these stator and rotor surfaces can be substantially larger than the diameters of the cylinder and worm of the screw.

As will be apparent from FIGS. 1 through 5, moreover, both the rotor 2 and the stator 1 have circumferentially rows of axially spaced and axially aligned mixing chambers 4 in the form of pockets which open at the respective surfaces.

These pockets (see FIG. 1), for example, are elongated in the axial direction and have front and rear ends 5 which are semicircular and have a given radius R. Between these semicircular ends, the flanks of the mixing chambers are parallel to one another and their axes.

All of the mixing chambers are identical with the exception of mixing chambers 4' and 4'' at the frustoconical ends 6' and 6'' of the rotor where the mixing chamber shapes differ because of the frustoconical configurations The numbers of mixing chambers 4 in the circumferential rows of both the rotor and stator are the same as are the number of mixing chambers along the respective axial rows.

The circumferential rows of the rotor 2 are offset axially from the circumferential rows of the stator 1 by about half the length L of the mixing chamber (compare FIGS. 1, 6 and 7).

Figure 3:
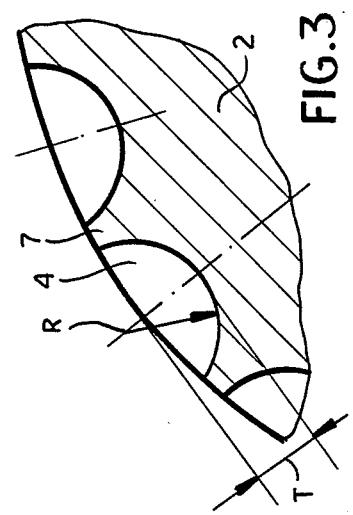
FIG. 3 is an enlarged detail view of the region III of FIG. 2.
Figure 4:
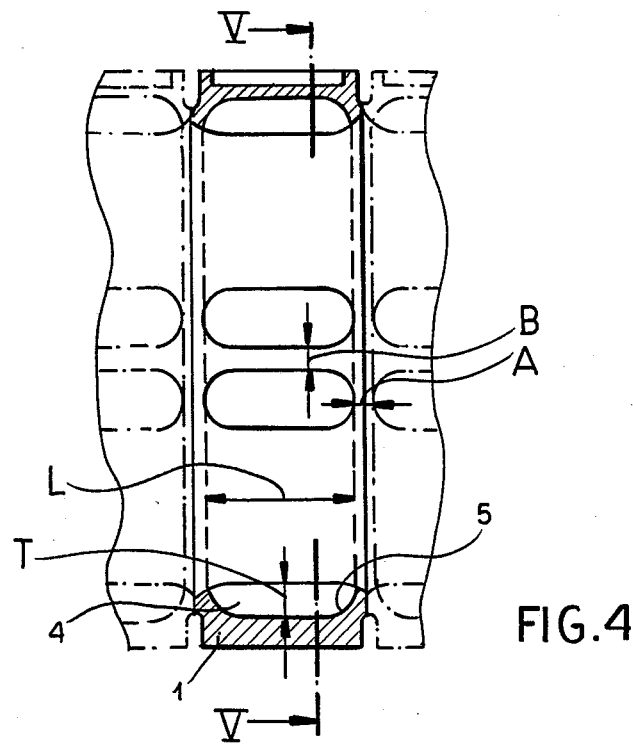
FIG. 4 is an enlarged sectional view of one of the ring elements forming the stator which is constituted by a plurality of such ring elements as can be seen from FIGS. 6 and 7.
Figure 5:
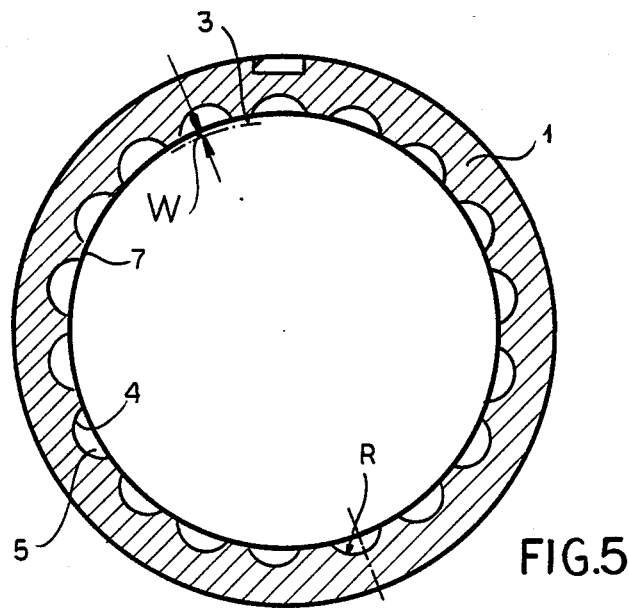
FIG. 5 is a sectional view along the line V—V of FIG. 4.

From a comparison of FIGS. 1 and 3, it will be seen that the mixing chambers 4 in radial section are circular segmental troughs with the radius of curvature equal to the given radius R. The trough depth T is determined by but less than the given radius R.

The mixing chamber 4 has a length L which is 3 to 4 times the radius R and in a best mode embodiment of the invention, L equals 50 millimeters.

The ribs 7 between mixing chambers at the surfaces of the rotor 2 and the stator 1 have a width B which is smaller than half the radius R.

The width of the gap 3 is preferably less than R/22 and even more preferably less than R/4.

The mixing chambers have an axial spacing A of about ⅓ the radius R. The diameter D of the rotor may be about 100 millimeters and the radius R between 10 and 20 millimeters, preferably about 15 millimeters. The length L of the mixing chambers should be greater as a lesser trough depth T is used.

As has been described, the mixing units are integrated in the worm units so that the rotors are driven with the screws and by the screws. The pump 9 in each case feeds the additive to the upstream end of the gap where the additive is intimately blended with the thermoplastified synthetic resin.

Heating units as shown at 30 over the regions 10 can heat the stator to an extent depending upon the quantity and temperature of the pumpable additive which is introduced. The additive, of course, is supplied with a static pressure in the mixing device which can be regulated by the pump 9 and its controller 50 to be greater than the static pressure of the thermoplastified flow in the gap.

We claim:

1. A method of blending a pumpable additive with a flow of a thermoplastified synthetic resin, comprising the steps of:
    (a) generating a flow of a thermoplastified synthetic resin by rotatably driving a plastifying screw in a cylinder of a synthetic-resin-displacing worm press and feeding the synthetic resin to said worm press whereby said synthetic resin is thermoplastified therein and displaced in a flow along said worm press;
    (b) along the path of said flow rotating a rotor with and connected to said screw and having an outer peripheral surface juxtaposed with an inner peripheral surface of a stator surrounding said rotor and connected with said cylinder so that said surfaces define an axially extending annular gap between them, each of said surfaces being formed with a plurality of angularly equispaced axially extending rows of axially elongated mixing chambers of identical outline each with semicircular ends of a given radius, the mixing chambers of said inner surface being axially offset from the mixing chambers of said outer surface by substantially half the length of said mixing chambers, said mixing chambers being troughs of circular arc segmental cross section with radii of curvature equal to said given radius and depths less than said given radius, the length of each mixing chamber being three to four times said given radius, the mixing chambers of successive rows of each surface being separated by webs having a thickness less than half of said given radius and said gap having a gap width generating a shear velocity gradient sufficient to effect intimate mixing in said gap;
    (c) passing said flow through said gap; and
    (d) pumping into said gap at at least one location around said rotor and at an upstream end of said gap, at least one pumpable additive miscible with said thermoplastified synthetic resin, thereby blending said additive with said thermoplastified synthetic resin.

2. The method defined in claim 1 wherein in step (a), said flow of thermoplastified synthetic resin is generated by a thermoplastifying screw having a diameter $d$ said rotor has a length of substantially $2d$ to $5d$.

3. The method defined in claim 1, further comprising the step of heating said stator.

4. The method defined in claim 3 wherein said stator is heated in response to a measurement of said flow and the temperature of the additive supplied to said gap.

5. The method defined in claim 1, further comprising the step of feeding said additive to said location at a static pressure of about 5 to 10% higher than a static pressure of said flow at said location.

6. An apparatus for blending a pumpable additive with a flow of a thermoplastified synthetic resin, comprising:
- a worm press having a cylinder and a plastifying screw rotatable in said cylinder and generating a flow of a thermoplastified synthetic resin fed to said worm press whereby said synthetic resin is thermoplastified therein and displaced in a flow along said worm press;
- a rotor along the path of said flow rotating with and connected to said screw and having an outer peripheral surface;
- a stator surrounding said rotor and connected with said cylinder, said stator having an inner peripheral surface juxtaposed with said outer peripheral surface of said rotor so that said surfaces define an axially extending annular gap between them, each of said surfaces being formed with a plurality of angularly equispaced axially extending rows of axially elongated mixing chambers of identical outline each with semicircular ends of a given radius, the mixing chambers of said inner surface being axially offset from the mixing chambers of said outer surface by substantially half the length of said mixing chambers, said mixing cambers being troughs of circular arc segmental cross section with radii of curvature equal to said given radius and depths less than said given radius, the length of each mixing chamber being three to four times said given radius, the mixing chambers of successive rows of each surface being separated by webs having a thickness less than half of said given radius and said gap having a gap width generating a shear velocity gradient sufficient to effect intimate mixing in said gap of said flow as said flow passes through said gap; and
- a pump communicating with a source of a pumpable additive to be admixed with said flow connected to said stator at at least one location around said rotor and at an upstream end of said gap, for feeding said pumpable additive into said gap for admixture to said thermoplastified synthetic resin, thereby blending said additive with said thermoplastified synthetic resin.

7. The apparatus defined in claim 6 wherein said flow of thermoplastified synthetic resin is generated by a thermoplastifying screw having a diameter d and said rotor has a length of substantially $2d$ to $5d$.

8. The apparatus defined in claim 7, further comprising means for heating said stator.

9. The apparatus defined in claim 8, further comprising means for heating said stator in response to a measurement of said flow and the temperature of the additive supplied to said gap.

10. The apparatus defined in claim 9 wherein said pump is dimensioned to feed said additive to said location at a static pressure of about 5 to 10% higher than a static pressure of said flow at said location.

* * * * *